United States Patent
Crompton et al.

(10) Patent No.: US 9,574,691 B1
(45) Date of Patent: Feb. 21, 2017

(54) HYBRID PUSH-TO-CONNECT FITTING DEVICE, ARRANGEMENT AND METHOD

(71) Applicant: Quick Fitting, Inc., Warwick, RI (US)

(72) Inventors: David B. Crompton, Tiverton, RI (US); Libardo Ochoa Dias, West Warwick, RI (US); Herbert J. Bouchard, West Greenwich, RI (US)

(73) Assignee: Quick FItting, Inc., Warwick, RI (US)

( * ) Notice: Subject to any disclaimer, the term of this patent is extended or adjusted under 35 U.S.C. 154(b) by 0 days.

(21) Appl. No.: 15/146,192

(22) Filed: May 4, 2016

(51) Int. Cl.
*F16L 37/092* (2006.01)
*F16L 15/00* (2006.01)

(52) U.S. Cl.
CPC .......... *F16L 37/0925* (2013.01); *F16L 15/008* (2013.01)

(58) Field of Classification Search
CPC ... F16L 37/091; F16L 37/0982; F16L 37/0925
USPC .......................................................... 285/340
See application file for complete search history.

(56) References Cited

U.S. PATENT DOCUMENTS

| | | | |
|---|---|---|---|
| 4,135,745 A * | 1/1979 | Dehar | F16L 37/0982 285/921 |
| 6,264,250 B1 * | 7/2001 | Teraoka | F16L 19/086 285/340 |
| 7,549,679 B2 * | 6/2009 | Brosius | F16L 19/086 285/340 |
| 7,878,555 B2 * | 2/2011 | Oh | F16L 37/091 285/340 |
| 9,086,179 B1 * | 7/2015 | Komolrochanaporn | F16L 37/091 |
| 2012/0200081 A1 * | 8/2012 | Reznar | F16L 37/091 285/345 |

FOREIGN PATENT DOCUMENTS

| | | | | |
|---|---|---|---|---|
| BE | EP 1564473 A1 * | 8/2005 | | F16L 37/091 |
| CA | 2386574 A1 * | 3/2001 | | F16L 37/091 |
| CN | 104154363 A * | 11/2014 | | F16L 37/091 |
| DE | EP 0610538 A1 * | 8/1994 | | F16L 37/0982 |
| EP | 2511583 | * | 10/2012 | F16L 37/091 |

* cited by examiner

*Primary Examiner* — David E Bochna
(74) *Attorney, Agent, or Firm* — Williams Mullen, PC; Thomas F. Bergert

(57) ABSTRACT

A fitting body having an interior surface is provided with a tube stop extending radially inwardly thereof, and one or more nut connector assemblies provided as part of a packing arrangement comprising at least one sealing ring, a spacer gland and a fastening ring. The packing arrangement can further include a release pusher positioned on the radially inward side of the nut connector, wherein the release pusher is capable of axial insertion into the cavity of the head connector in order to lift teeth of the grip ring radially outwardly to permit insertion and removal of tubes to be connected via the center body.

20 Claims, 10 Drawing Sheets

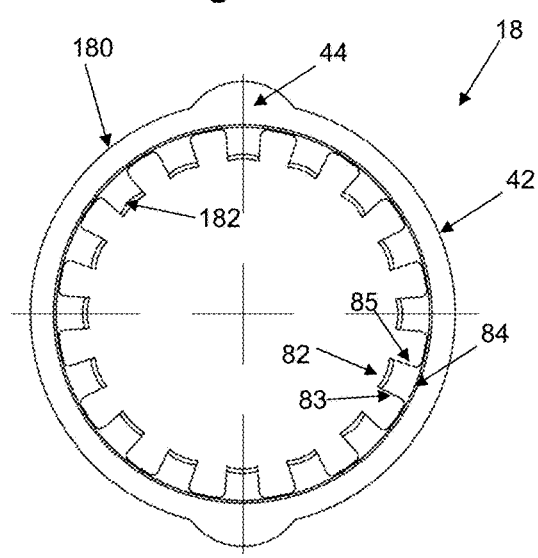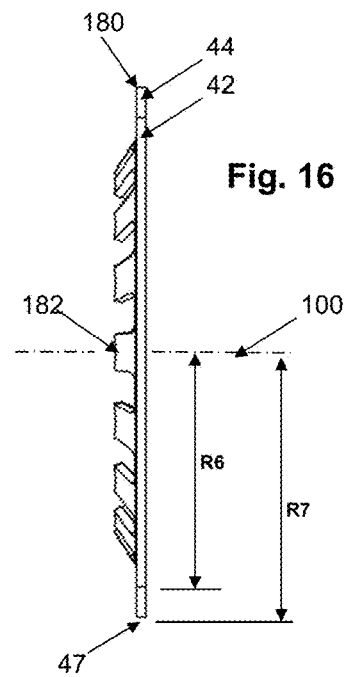

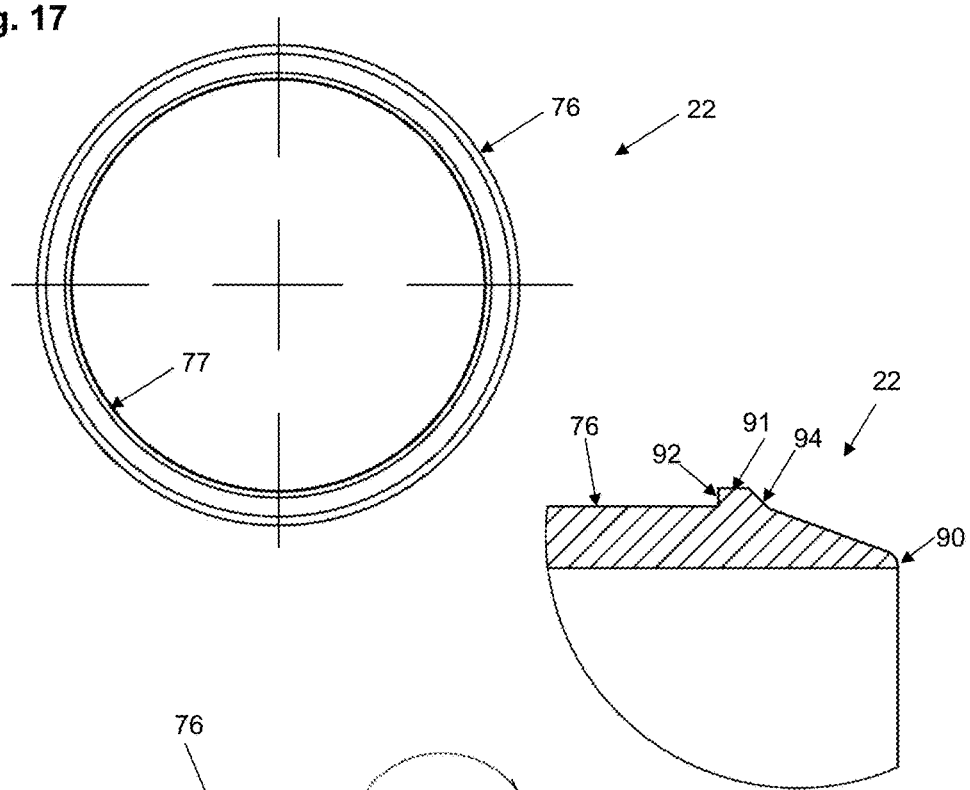
Fig. 17
Fig. 19
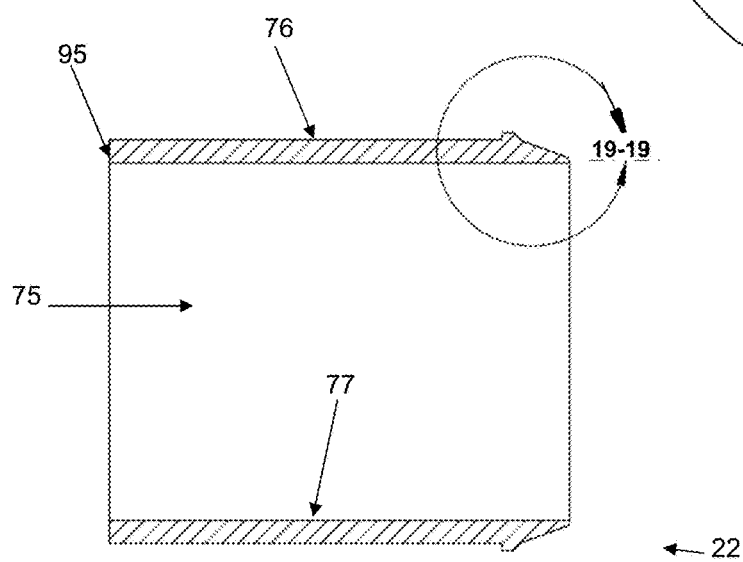
Fig. 18

HYBRID PUSH-TO-CONNECT FITTING DEVICE, ARRANGEMENT AND METHOD

FIELD OF THE INVENTION

The present invention relates to piping conduits, and more particularly to a hybrid push-to-connect fitting device, arrangement and method that facilitates protection of contents.

BACKGROUND

Piping systems exist to facilitate the flow of fluids (e.g., liquid, steam, gas (such as air) or plasma). For example, homes, schools, medical facilities, commercial buildings and other occupied structures generally require integrated piping systems so that water and/or other fluids can be circulated for a variety of uses. Liquids and/or gases such as cold and hot water, breathable air, glycol, compressed air, inert gases, cleaning chemicals, waste water, plant cooling water and paint and coatings are just some examples of the types of fluids and gases that can be deployed through piping systems. Tubing and piping types can include, for example, copper, stainless steel, CPVC (chlorinated polyvinyl chloride) and PEX (cross-linked polyethylene). For purposes of the present disclosure, the terms "pipe", "piping", "tube" or "tubing" will be understood to encompass one or more pipes, tubes, piping elements and/or tubing elements, and may be used interchangeably.

Piping connections are necessary to join various pieces of pipe and must be versatile in order to adapt to changes of pipe direction required in particular piping system implementations. For example, fittings and valves may be employed at the ends of open pieces of pipe that enable two pieces of pipe to fit together in a particular configuration. Among fitting types there are elbows, "tees", couplings adapted for various purposes such as pipe size changes, ends, ball valves, stop valves, and partial angle connectors, for example.

In the past, pipe elements have been traditionally connected by welding and/or soldering them together using a torch. Soldering pipe fittings can be time-consuming, unsafe, and labor intensive. Soldering also requires employing numerous materials, such as copper pipes and fittings, emery cloths or pipe-cleaning brushes, flux, silver solder, a soldering torch and striker, a tubing cutter and safety glasses, for example. The process for soldering pipes can proceed by first preparing the pipe to be soldered, as the copper surface must be clean in order to form a good joint. The end of the pipe can be cleaned on the outside with emery cloth or a specially made wire brush. The inside of the fitting must be cleaned as well. Next, flux (a type of paste) can be applied to remove oxides and draw molten solder into the joint where the surfaces will be joined. The brush can be used to coat the inside of the fitting and the outside of the pipe with the flux. Next, the two pipes are pushed together firmly into place so that they "bottom out"—i.e., meet flush inside the fitting. The tip of the solder can be bent to the size of the pipe in order to avoid over-soldering. With the pipes and fitting in place, the torch is then ignited with the striker or by an auto-strike mechanism to initiate soldering. After heating for a few moments, if the copper surface is hot enough such that it melts when touched by the end of the solder, the solder can then be applied to the joint seam so that it runs around the joint and bonds the pipe and fitting together.

In recent years, push-fit technology has been employed with piping systems, and particularly with plumbing systems, to reduce the dangers and time involved in soldering joints and other connection methods. Push-fit methods require minimal knowledge of pipe fittings and involve far fewer materials than soldering. For example, one may only need the pipes, quick-connect fittings, a chamfer/de-burring tool and tubing cutter in order to connect pipes using push-fit technology. The steps involved in connecting piping systems using push-fit technology can be outlined as follows. First, the pipe is cut to the appropriate length and the end of the pipe is cleaned with the de-burring tool. Then the pipe and fitting are pushed together for connection. The fitting is provided with a fastening ring (also called a collet, grip ring or grab ring) having teeth that grip the pipe as it is inserted. The fastening ring device is employed to provide opposing energy, preventing the device from disconnection while creating a positive seal. Accordingly, no wrenches, clamping, gluing or soldering is involved. Push-fit and/or quick-connect technology for piping systems can be obtained, for example, through Quick Fitting, Inc. of Warwick, R.I., USA, suppliers of the CoPro®, ProBite®, LocJaw™, Blue-Hawk™ CopperHead® and Push Connect® lines of push fittings and related products. Also, such technology is described, for example, in U.S. Pat. No. 7,862,089, U.S. Pat. No. 7,942,161, U.S. Pat. No. 8,205,915, U.S. Pat. No. 8,210,576, U.S. Pat. No. 8,398,122, U.S. Pat. No. 8,480,134, U.S. Pat. No. 8,844,974, U.S. Pat. No. 8,844,981, U.S. Pat. No. 9,068,680, and U.S. Pat. No. 9,217,529, the disclosures of which are incorporated herein by reference in their entireties.

Among other specific issues, push fitting technologies generally have no stopping force for resisting or preventing the rotation of the fitting about an inserted tubing element. In various applications, such as with hard materials including stainless steel and copper, it is desirable to prevent the fitting from rotating about the inserted tubing element for stability, strength, durability and overall operation.

SUMMARY OF ASPECTS OF THE PRESENT INVENTION

In various embodiments of the present invention, one or more sealing member gasket inserts (e.g., O-ring members) fit within a first sealing ring compartment defined in the interior wall of the fitting. A spacer gland can be provided to provide support for the one or more sealing rings. In addition, at each pipe receiving end of the fitting, a nut connector assembly compartment is machined into the interior wall to retain a nut connector assembly and at least a portion of the body of the fastening ring. The interior housing elements provide integrated support for the sealing member(s) and fastening ring when opposing force is applied to piping elements that have been inserted into the fitting. In various embodiments, a nut connector assembly comprising a nut connector and a chamfered lock washer is employed to provide additional support for the fastening ring and to cooperate with the release pusher to facilitate connection and disconnection of piping elements while resisting up to thirty foot-pounds of rotational torque. The nut connector member further maintains the fastening ring in place against elements of the fitting inner wall.

Aspects of the present invention provide a novel hybrid push-to-connect fitting joint packaging arrangement comprising a fastening ring having one or more prolated ear members, at least one o-ring member, a spacer gland and a nut connector assembly compartment adapted to receive the one or more ear members in order to prevent the fastening ring and thus the fitting from rotating about an inserted tube member. In various embodiments, the one or more ear members can extend from respective and opposite circumferential ends of the outer edge of the fastening ring base. The nut connector assembly can be positioned adjacent the fastening ring and thereby hold the fastening ring in place when the package is assembled in the fitting.

The release pusher provided as part of embodiments of the present invention is employed to facilitate the release of tubing, piping and other cylindrical objects inserted into a fitting. The release pusher is manually pushed into the cavity formed by the tube support member within the fitting body and tapered edges of the release pusher generally or nearly abut the installed fastening ring. When it is desired to release an inserted pipe, for example, from the fitting, the release pusher can be forced in the direction of the fastening ring such that its angular surfaces depress the fastening ring teeth off of the surface of the inserted pipe, thereby allowing the pipe to be removed.

In various embodiments, a device according to the present invention includes a fitting body having an interior surface with a tube stop extending radially inwardly thereof, and one or more nut connector assemblies provided as part of a packing arrangement comprising at least one sealing ring, a spacer gland and a fastening ring. The packing arrangement can further include a release pusher positioned on the radially inward side of the nut connector, wherein the release pusher is capable of axial insertion into the cavity of the head connector in order to lift teeth of the grip ring radially outwardly to permit insertion and removal of tubes to be connected via the fitting body. In various embodiments of the present invention, the release pusher is permanently secured to the fitting and is part of the packing arrangement.

For purposes of the present disclosure, the term "tube", "pipe", "piping", "conduit", "conduit element" or "piping element" will be understood to encompass one or more pipes, tubes, conduits, piping elements and/or tubing elements, and may be used interchangeably. Further, for purposes of the present disclosure, a fitting can encompass a valve member and other piping elements including, but not limited to: a coupling joint, an elbow joint, a tee joint, a stop end, a ball valve member, tubing and other objects having substantially cylindrical openings. The interior compartments and packing arrangements provide integrated support for the sealing members and fastening ring when opposing force is applied to piping elements that have been inserted into the coupling arrangement. The present invention can be applied in heating, ventilation and air conditioning (HVAC) environments, among many others.

Other methods, devices and arrangements as described herein are provided by the present invention.

BRIEF DESCRIPTION OF THE DRAWINGS

FIG. 15 is a right side view of a fastening ring in accordance with embodiments of the present invention.

FIG. 16 is a front view of the fastening ring of FIG. 15.

FIG. 17 is a right side view of a release pusher in accordance with embodiments of the present invention.

FIG. 18 is a front view of the release pusher of FIG. 17.

FIG. 19 is an enlarged view of the portion of the release pusher taken from encircled portion 19-19 of FIG. 18.

DETAILED DESCRIPTION OF THE PREFERRED EMBODIMENTS

Figure 1:
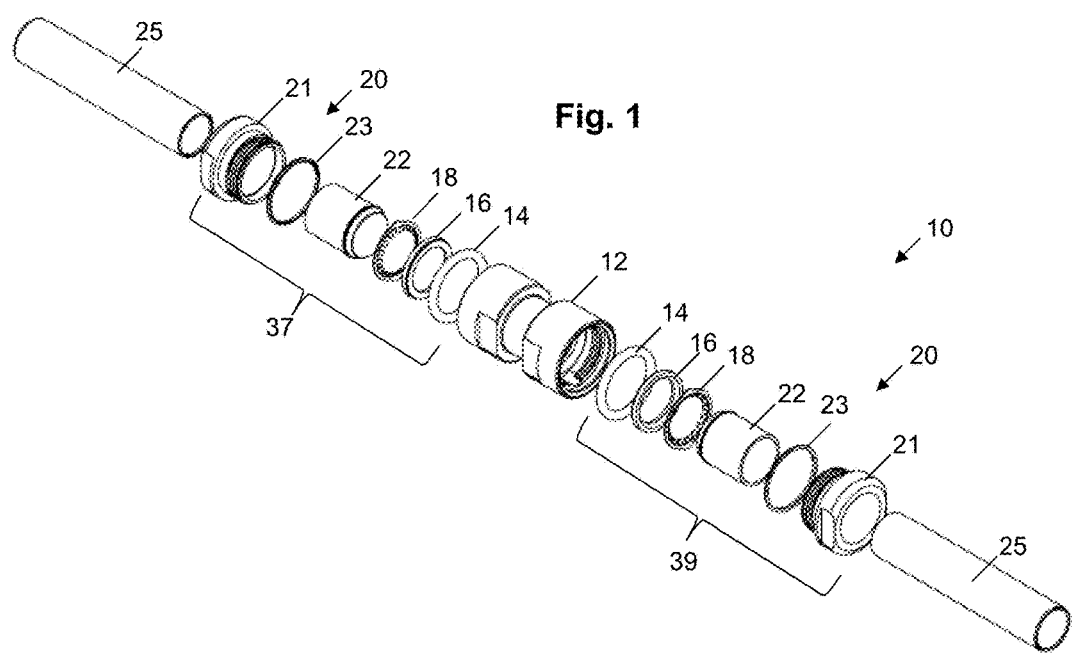
FIG. 1 is an exploded front perspective view of a device in accordance with embodiments of the present invention.
Figure 2:
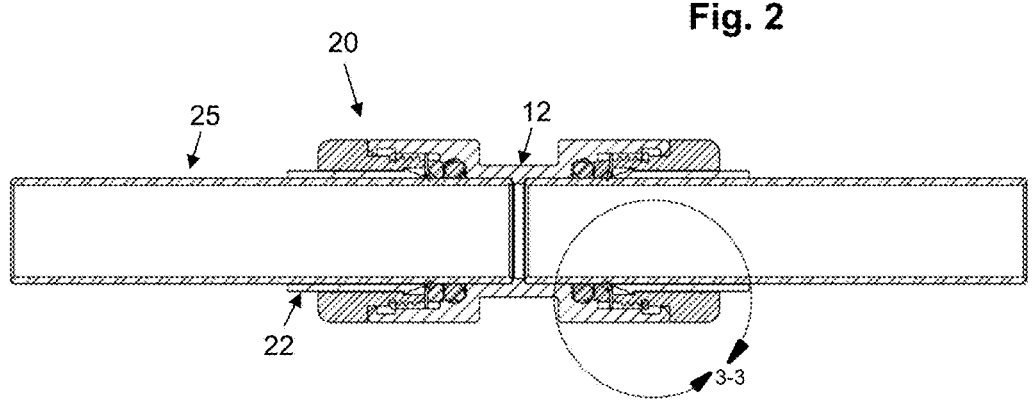
FIG. 2 is a front cross-sectional view of one embodiment of the device of the present invention.

In the device 10 of embodiments of the present invention as shown in FIGS. 1 through 24, elements of the device as shown include: a fitting body member 12, at least one sealing ring 14, at least one spacer gland 16, at least one fastening ring 18, at least one nut connector assembly 20 and at least one release pusher 22. FIGS. 1 through 3, 23 and 24 also show two tubes 25 connected or being connected using the device 10. In various embodiments, the fitting body member 12 can be forged CW617N brass, with full porting and full flow fitting, for example. In other embodiments, the fitting body member 12 can be a plastic material. In various embodiments, the nut connector assembly 20 comprises a nut connector 21 and a lock washer 23.

Figure 3:
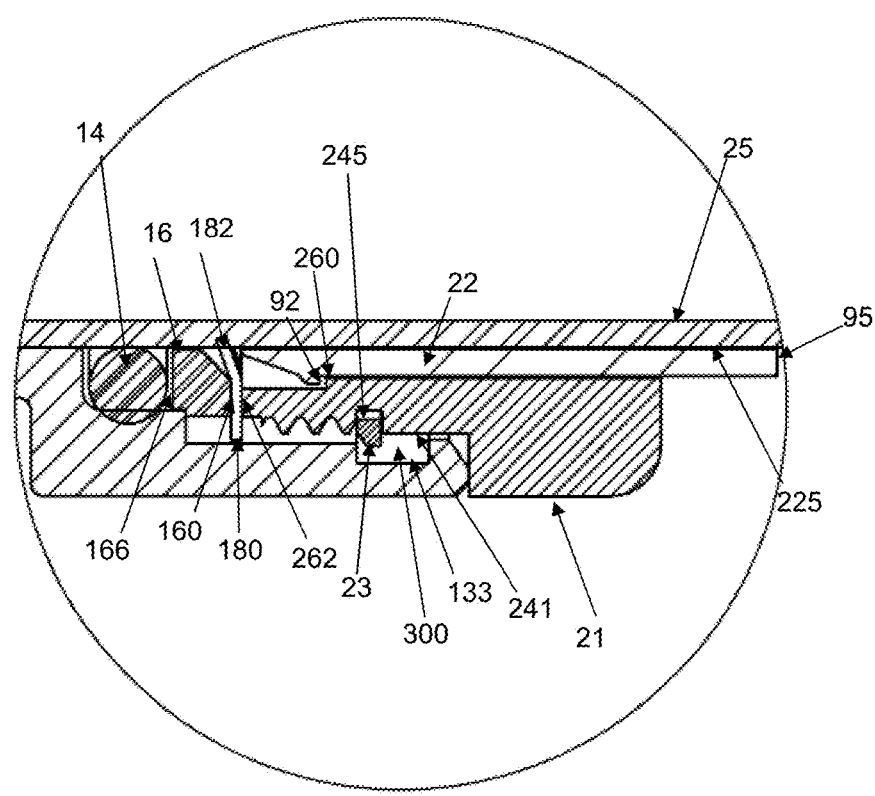
FIG. 3 is an enlarged view of the portion of the device taken from encircled portion 3-3 of FIG. 2.
Figure 4:
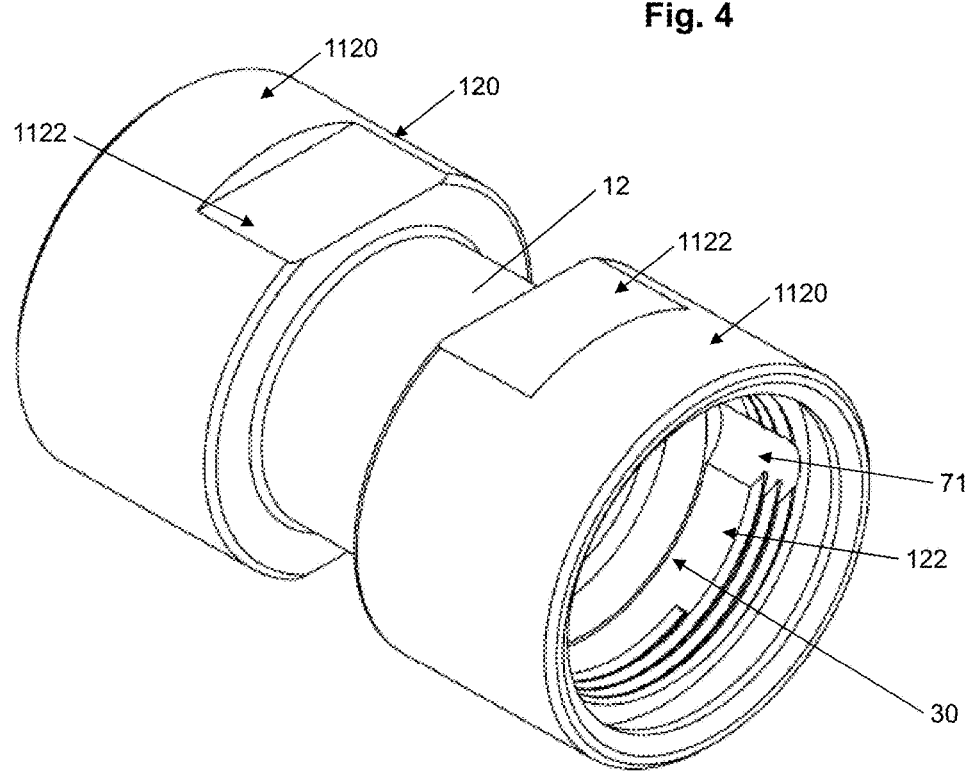
FIG. 4 is a perspective view of a fitting body in accordance with embodiments of the present invention.
Figure 5:
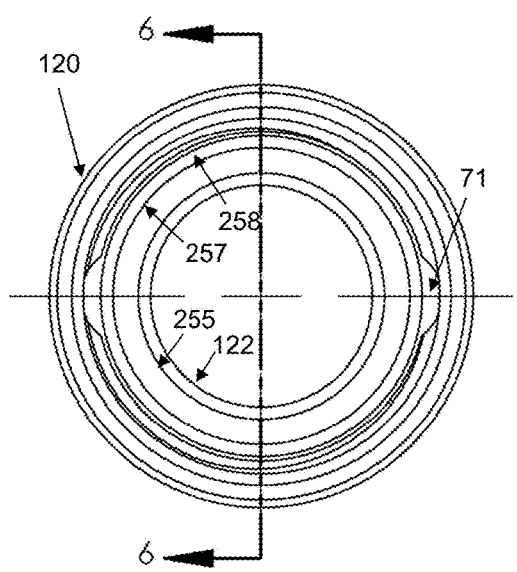
FIG. 5 is a right side view of the fitting body of FIG. 4.
Figure 6:
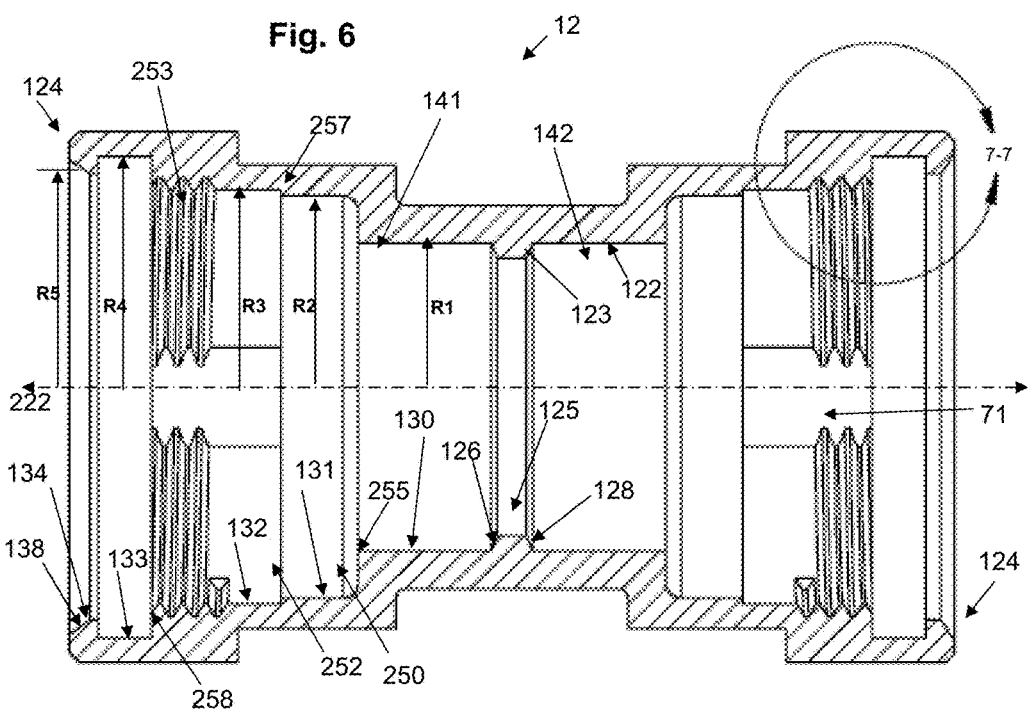
FIG. 6 is a cross-sectional view of the fitting body as taken along line 6-6 of FIG. 5.
Figure 7:
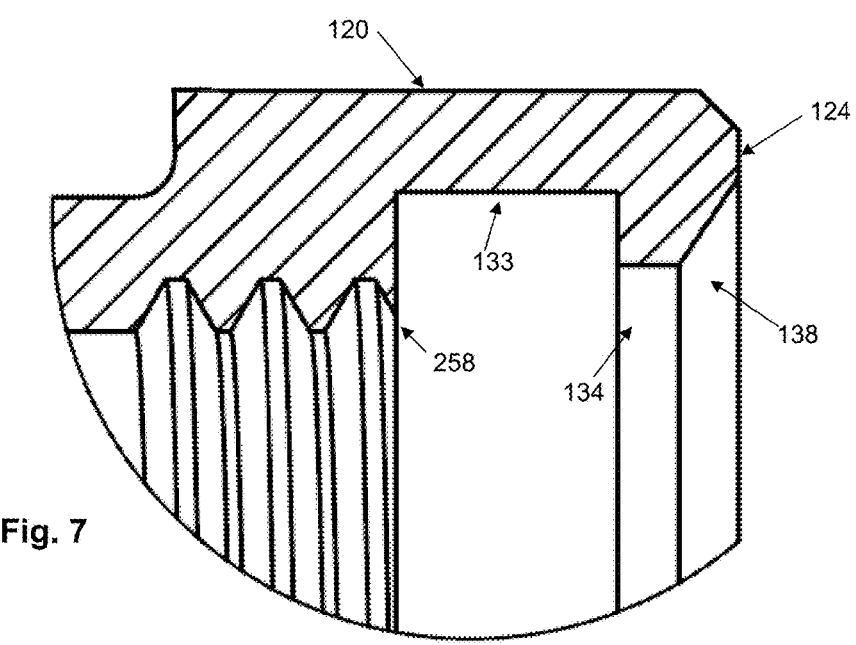
FIG. 7 is an enlarged view of the portion of the device taken from encircled portion 7-7 of FIG. 6.
Figure 8:
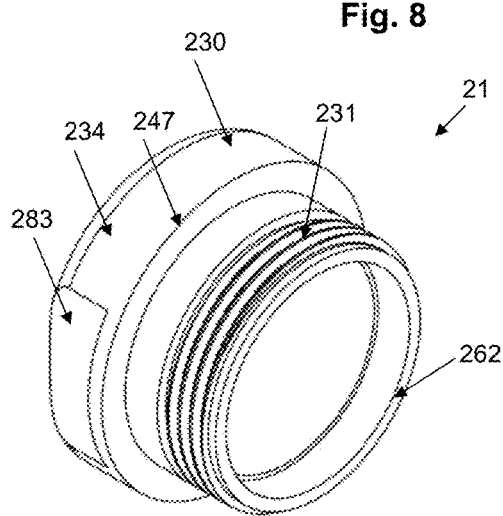
FIG. 8 is a front right perspective view of a nut connector in accordance with embodiments of the present invention.
Figure 9:
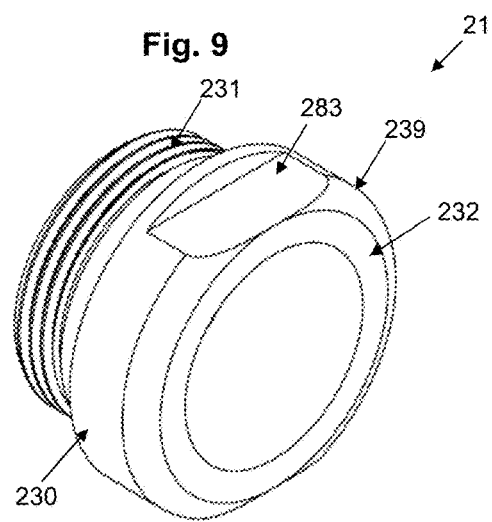
FIG. 9 is a rear right perspective view of a nut connector in accordance with embodiments of the present invention.
Figure 10:
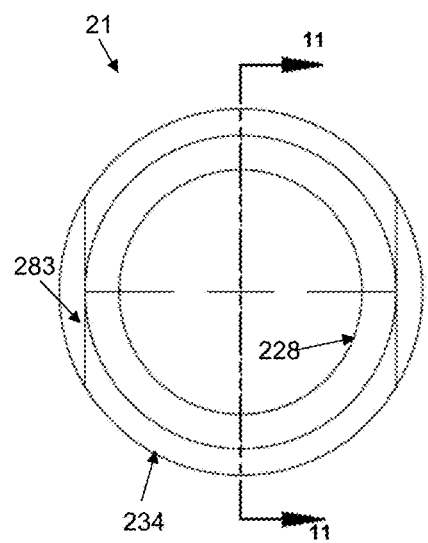
FIG. 10 is a right side view of the nut connector of FIG. 9.

In various embodiments, the fitting body member 12 is a substantially cylindrical body having an exterior surface 120, and an interior surface 122 having a tube stop 123 extending radially inwardly thereof. The tube stop 123 effectively divides the fitting interior into first 141 and second 142 interior wall portions, and the tube stop element includes first 126 and second 128 radially extending edges, and an axially extending surface 125. The edges 126, 128 act to stop the axial insertion of tubes during operation of the present invention, and surface 125 is generally axially aligned with the internal surfaces of inserted tubes to facilitate smooth movement of any materials or fluids inside of the tubes, for example. The interior surface 122 forms a cavity 30 extending axially through the fitting body member 12, as shown in FIG. 4. The fitting body member 12 also includes axially outer wall portions 124, as shown in FIGS. 6 and 7, and the wall portions 124 can vary in thickness depending upon the particular application involved. In various embodiments, the exterior surface 120 at each axial end of the fitting 12 is formed with a rounded portion 1120 and a flattened portion 1122 as shown in FIG. 3 so as to facilitate gripping of the fitting with a wrench or other similar tool during operation. The flattened portions 1122 are shown on the axially interior sides of the axial ends of the fitting in FIG. 3, and such an arrangement can facilitate the use of a single wrench to hold both axial ends at the same time when applying tightening or untightening torque to one or more nut connectors 21 during operation.

As shown in FIG. 6, the fitting body member 12 is formed with an interior surface 122 having various axially extending wall surface segments 130, 131, 132, 133 and 134, each of which has a respective radial distance from the central axis 222 of the fitting body member 12. For instance, segment 130 has a radial distance R1, segment 131 has a radial distance R2, segment 132 has a radial distance R3, segment 133 has a radial distance R4, and segment 134 has a radial distance R5. Segment 131 corresponds to a sealing ring compartment 250 portion of the interior surface 122 of the fitting body member 12, and segments 132, 133 and 134 correspond to a nut connector assembly compartment 252 of the interior surface 122 of the fitting body member 12. The sealing ring compartment 250 can be defined as extending axially outwardly from inner surface edge 255 to inner surface lip 257, and the nut connector assembly compartment 252 can be defined as extending from lip 257 to axially outer wall portion 124. As shown in FIGS. 6 and 7, the nut connector assembly compartment 252 includes a threaded portion 253 at segment 132 that is axially internal of a gap wall portion 133 and a ridge 134 of axially outer wall portion 124. The gap wall portion 133 can be defined as extending axially outwardly from initial thread edge 258 to ridge 134 of axially outer wall portion 124.

As further shown in FIG. 6, radial distance R4 to gap wall portion 133 is greater than the radial distances R1, R2, R3 and R5 as shown. Radial distance R5 to ridge 134 is greater than the radial distances R1, R2 and R3, which provides a wider opening for the insertion of elements of the packing arrangement as described elsewhere herein. It will be appreciated that outer wall portion 124 can include a chamfered edge as at 138 to facilitate insertion of packing arrangement elements in accordance with various embodiments of the present invention. Radial distance R1 to segment 130 corresponds to the segment where an inserted tube engages the fitting interior surface 122. Radial distance R2 corresponds to the sealing ring compartment 250 and is slightly shorter than radial distance R3 in various embodiments of the present invention, which can accommodate elements of the spacer gland 16 as described elsewhere herein.

Figure 11:
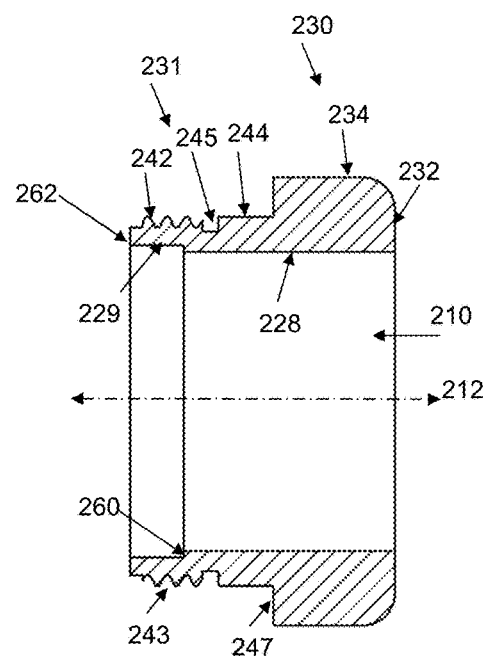
FIG. 11 is a cross-sectional view of the nut connector as taken along line 11-11 of FIG. 10.

FIGS. 8 through 11 illustrate embodiments of the nut connector 21 of the present invention. As shown therein, nut connector 21 has an interior wall surface 228, a head portion 230 and a body portion 231, wherein the head portion has an axially outer surface 232 and a radially outer surface 234, with an outer shoulder surface 239 therebetween. In various embodiments, the head portion radially outer surface 234 and shoulder surface 239 are formed with one or more flattened portions 283 to facilitate grasping of the nut connector 21 by a wrench or similar tool during operation. The body portion 231 has a radially outer surface 241 including a thread 242 on an axially outer portion 243 thereof, a neck segment 244 extending axially outwardly from head portion under-surface 247 and having a substantially smooth surface, and a groove 245 formed in the radially outer surface 241 between the thread 242 and the neck segment 244. The groove 245 extends radially inwardly of the thread 242 and the neck segment 244, and is formed so as to receive a lock washer 23 as described elsewhere herein. The body portion 231 also includes a segment 260 extending radially outwardly from interior wall 228 to a secondary interior wall 229, wherein interior wall 228 and secondary interior wall 229 define a cavity 210 extending axially through the nut connector 21 along axis 212. As shown in FIG. 11, the radial distance from axis 212 to interior wall 228 is less than the radial distance from axis 212 to secondary interior wall 229. The segment 260 provides an engagement surface for the release pusher 22 in various embodiments as described elsewhere herein. Nut connector 21 further includes an axially outer edge 262 for engaging the base 180 of fastening ring 18 during operation as described elsewhere herein.

Figure 12:
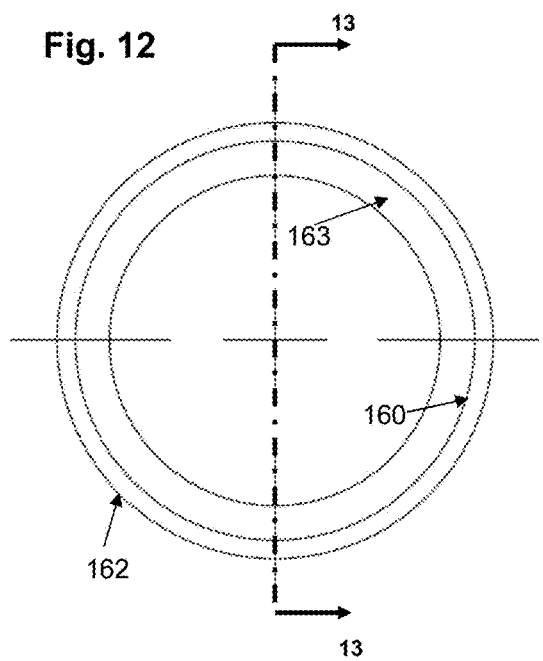
FIG. 12 is a right side view of a spacer gland in accordance with embodiments of the present invention.
Figure 13:
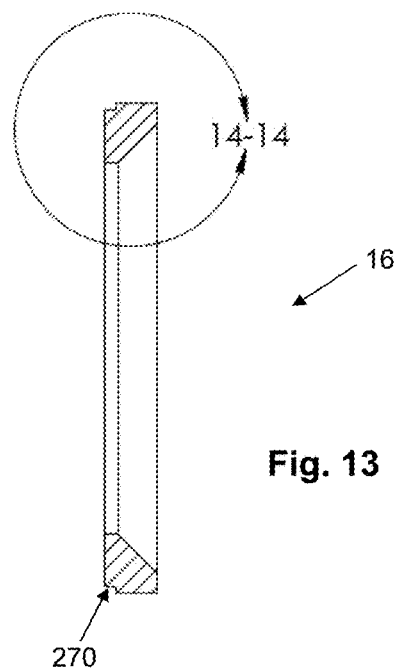
FIG. 13 is a cross-sectional view of the spacer gland as taken along line 13-13 of FIG. 12.
Figure 14:
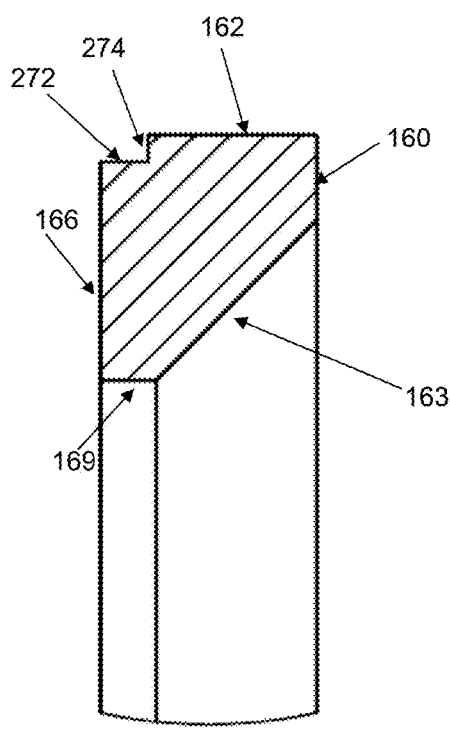
FIG. 14 is an enlarged view of the portion of the spacer gland taken from encircled portion 14-14 of FIG. 13.

FIGS. 12 through 14 illustrate a spacer gland 16 in accordance with embodiments of the present invention. As shown therein, the spacer gland 16 has a circumferential base 162, a sealing member-engaging surface 166 extending radially inwardly from the base 162, and fastening ring-engaging surfaces 160 and 163. Surface 160 extends radially inwardly from base 162 and acts to help maintain the fastening ring base 180 in position against axially outer edge 262 of nut connector 21 during operation, as shown in FIG. 3. In various embodiments, spacer gland 16 can comprise an injection-molded plastic or a metal material such as brass, for example. Surface 160 engages the base 180 of the fastening ring 18 and pinches the fastening ring base 180 against the axially outer edge 262 of the nut connector 21, whereas surface 163 engages the teeth 182 of the fastening ring 18 during operation, and acts as a barrier preventing over-extension of the fastening ring teeth during operation. In one embodiment of the present invention, the spacer gland 16 is split, including a first circumferential end point and a second circumferential end point that do not connect and thereby form a slit, which allows the gland to be manually pinched and compressed to facilitate installation into the fitting 12. As shown in FIGS. 13 and 14, the spacer gland 16 can include a notch 270 formed by a wall portion 272 extending axially inwardly of surface 163, and a wall portion 274 extending radially inwardly of base 162. Notch 270 provides a support surface for the spacer gland 16 to securely engage the inner surface lip 257 of the interior surface 122 of the fitting 12. The spacer gland 16 further includes a radially inner surface 169 for engaging an inserted tube 25 during operation.

FIGS. 15 through 16 illustrate a fastening or grip ring 18 according to embodiments of the present invention. As shown therein, the fastening ring 18 includes a substantially cylindrical base 180 that has a plurality of bifurcated or square-edged teeth 182 extending radially inwardly from and along the base 180 of the ring 18. The number of teeth can readily vary in number and size. The fastening ring 18 can comprise a spring steel formulation, for example, that enables the fastening ring to be malformed during installation, while springing back into its originally manufactured position once installed. The fastening ring can be split, in various embodiments of the present invention. Such split arrangements for the spacer gland and fastening ring are shown and described, for example, in U.S. Pat. No. 9,068,860, the disclosure of which is hereby incorporated by reference. The fastening ring 18 is capable of grabbing an inserted pipe's surface via two or more teeth 182 to ensure connections cannot be pulled apart. In various embodiments, each tooth can have a substantially squared off shape, including a top edge 82, a left edge 83, a bottom edge 84 and a right edge 85. As shown in FIG. 15, the teeth 182 of the fastening ring 18 can be provided with an inner edge 82 that is curved in order to accommodate a substantially cylindrically shaped tube inserted into the assembly of embodiments of the present invention. Further, the bottom edge 84 of each tooth is integrally connected to the circumferential base 180 of the fastening ring 18.

In various embodiments of the present invention, the fastening ring 18 can be provided with one or more prolated ear members 44 extending from one or more areas of the common outer edge 42 of the fastening ring base 82. As shown in FIG. 16, for example, the common outer edge 42 has a radius R6 from center line 100 and the outer peak edge 47 of the prolated ear members 44 has a radius R7 from center line 100, wherein R7 is greater than R6. In this way, the prolated ear members 44 are adapted to slidingly mate with and be retained within slot portions 71 of inner surface 122 of the fitting 12. While ear members 44 are shown as being arc-shaped in FIGS. 15 through 18, it will be appreciated that other shapes can be employed and work equally well. Other shapes employed for the ear members 44 are necessarily accommodated by equally and oppositely shaped slots 71 in the inner portion 122 of the fitting 12. In various embodiments, the fastening ring teeth 182 are angled downwardly from the substantially cylindrical perimeter of the ring, toward the fitting interior and the fastening ring-engaging surface 163 of the spacer gland 16 during operation, as illustrated in FIG. 3. In this way, when a pipe or tubing is inserted into the fitting, the teeth exert a pressure against the pipe to discourage the pipe from slipping or moving back out of the fitting.

FIGS. 17 through 19 show an embodiment of a release pusher 22 element. As shown therein, pusher 22 is substantially cylindrical with an outer surface 76, and an inner surface 77 forming an opening 75 extending axially therealong. Release pusher 22 includes an external tip 90 at the fastening ring engaging end thereof. The release pusher 22 also includes a radially outer ledge segment 91, a ledge back wall 92, and a second outer wall segment 94. The pusher 22 can comprise an injection-molded plastic or a metal material such as brass, for example. When pressure is applied on the back side 95 of the release pusher 22, the external tip 90 can engage the inside surface of the fastening ring teeth 182 and the ledge back wall 92 can removably engage the segment 260 of the nut connector 21, as shown in FIG. 3.

Figure 20:
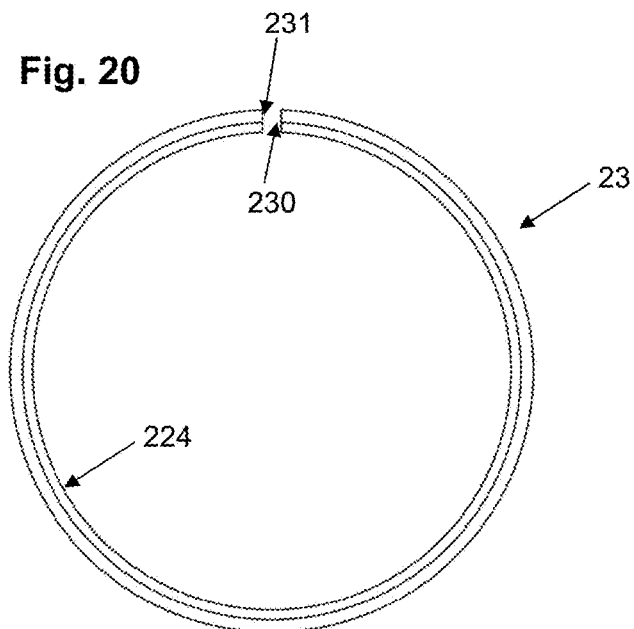
FIG. 20 is a right side view of a lock washer in accordance with embodiments of the present invention.
Figure 21:
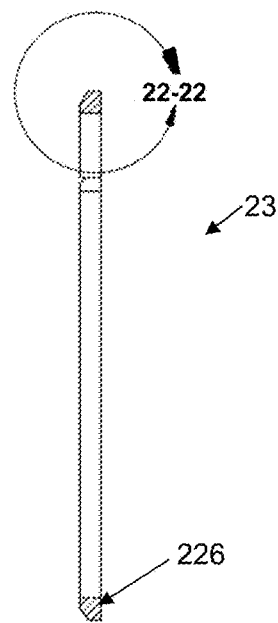
FIG. 21 is a front view of the lock washer of FIG. 20.
Figure 22:
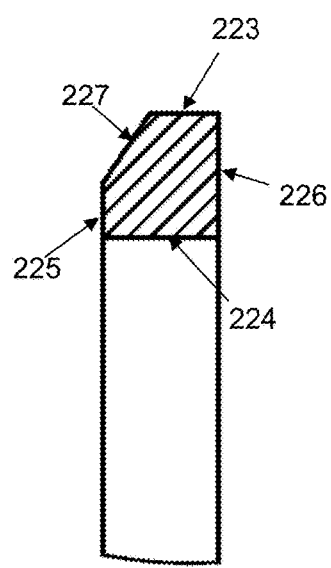
FIG. 22 is an enlarged view of the portion of the lock washer taken from encircled portion 22-22 of FIG. 21.

FIGS. 20 through 22 illustrate a lock washer 23 as part of the nut connector assembly 20 of the present invention. As shown therein, washer 23 has a circumferential edge 223, an inner surface 224, an axially inner surface 225, an axially outer surface 226, and an engaging ledge surface 227 extending radially and axially outwardly from axially inner surface 225 to edge 223. Washer 23 can also be split in various embodiments of the present invention, including a first circumferential end point 230 and a second circumferential end point 231 that do not connect and thereby form a slit, which allows the washer to be manually pinched and compressed to facilitate installation into the fitting 12.

As shown in FIGS. 1 through 3, 23 and 24, one or more nut connector assemblies 20 can be provided as part of an interior packing arrangement 37, 39 comprising at least one sealing ring (which can be optionally lubricated) 14, a spacer gland 16 and a grip or fastening ring 18. In various embodiments, the packing arrangement 39 also includes release pusher 22. Sealing member 14 can be substantially ring-shaped, and can be formed of a rubber-based material or similar rigid yet deformable material designed to slightly compress when pressure is applied.

It will be appreciated that each nut connector 21 is a substantially ring-shaped body with an interior surface 228 defining an axially extending opening 210 therein, and each of the sealing ring 14, spacer gland 16, grip ring 18 and release pusher 22 has a substantially ring-shaped body forming an opening extending through the body along an axis which is aligned with axis 212 of nut connector when installed. Each of sealing ring 14, spacer gland 16, grip ring 18 and retainer ring 22 has an internal diameter that allows for smooth and snug engagement of a piping or tubing element external surface 225. In various embodiments, the diameter of the fastening ring 18 to the radially interior edge of the fastening ring teeth 182 is less than the internal diameter of the spacer gland 16, sealing ring 14 and retainer ring 22, as the fastening ring teeth 182 engage the outer surface 225 of an inserted tube 25 during operation. The diameter of the fastening ring to the teeth 182 is manipulable during operation so as to permit insertion, removal and retention of tube elements 25 as described herein. First 37 and second 39 packing arrangements can be housed within interior portions 141 and 142, respectively, of the fitting body member 12, as shown in FIGS. 1 and 26, for example.

In various embodiments of fabrication and/or installation, a fitting body member 12 is provided as described herein, and one or more packing arrangements (e.g., 37, 39) are installed in respective portions thereof. For example, one or more sealing rings 14 are inserted into the sealing ring compartment 250, followed by a spacer gland 16 and a fastening ring 18 as shown in FIG. 3. A release pusher 22 can then be inserted into the cavity 210 at one end of the nut connector 21, as shown in FIG. 3. The nut connector assembly 20, including nut connector 21 and lock washer 23, with release pusher 22 inside of the nut connector, are also inserted into the nut connector assembly compartment 252.

In various embodiments, during installation, the lock washer 23 resides in the groove 245 of the nut connector 21 and in the gap 300 formed between the gap wall portion 133 of the fitting 12 and the body portion radially outer surface 241 of the nut connector 21, as shown in FIGS. 3 and 6 through 11. When the thread 242 on the nut connector 21 is not fully engaged with the thread 253 on the fitting 12, there is a gap between the fastening ring base 180 and the fastening ring engaging surface 160 of the spacer gland 16. As the nut connector 21 is rotated so as to tighten its connection with the thread 253 on the fitting 12, its axially outer edge 262 engages the fastening ring base 180, sliding the base 180 along the interior wall segment 132. It will be appreciated that the release pusher 22 may be simultaneously engaged so as to lift fastening ring teeth 182 off of the outer surface 225 of an inserted tube 25, to enable the fastening ring 18 to move smoothly toward the spacer gland 16. For example, an external tool (or alternatively, manual or similar pressure) can be applied to the end 95 of the release pusher 22, thereby forcing the fastening ring teeth 182 radially outwardly such that a tube 25 can be smoothly inserted until it reaches the tube stop 123 of the center body member 12. At such time, the force on the release pusher 22 can be released, thereby allowing the retaining ring back ledge 92 to rest against surface 260 of nut 21, and allowing the fastening ring teeth 182 to engage the outer surface 225 of the tube 25. The axial movement of the nut connector 21 also causes the lock washer 23 to move axially inwardly of the fitting 12, within cavity 300.

It will be appreciated that, in various embodiments, the packing arrangement (e.g., 37 and/or 39) results in a loose cavity where the only contact of the tube 25 is made by the fastening ring 18. Once the nut connector 21 is locked with the fitting, the connector 21 fully encapsulates the fastening ring 18 and prevents a user from trying to unthread the connector to expose the internal components of the packing arrangement. The arrangement further prevents rotation of an inserted tube 25, making the device a rigid and/or permanent fitting. Should the nut connector be loosened, it will be prevented from being fully removed due to the lock washer 23 engaging the axially outer wall portion 124 of the fitting 12. As such, the nut connector assembly 20 provides a secondary locking member for the device.

Figure 23:
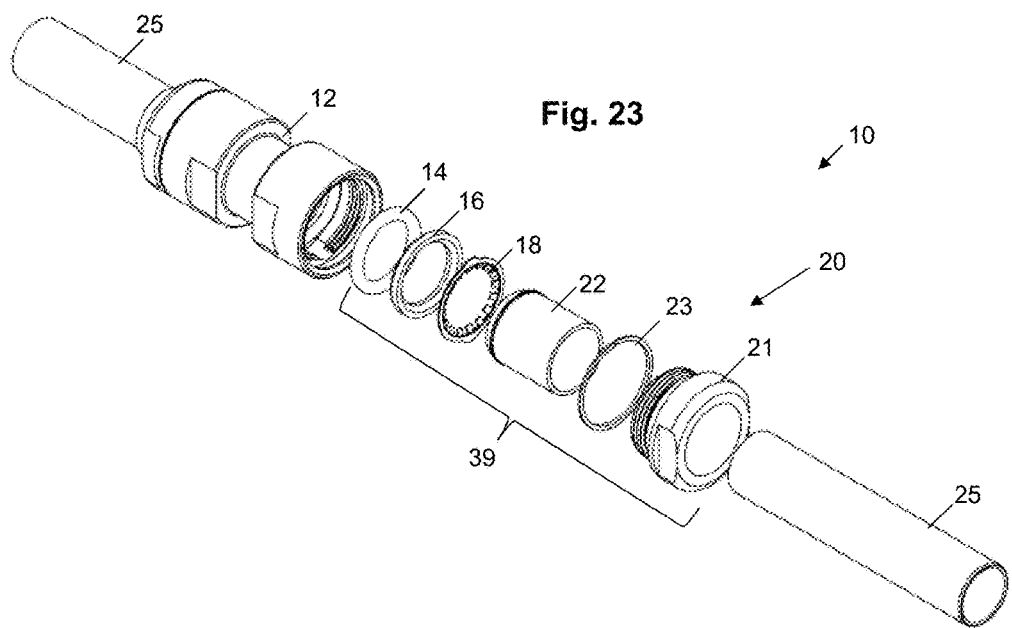
FIG. 23 is an exploded front perspective view of a device with an installed nut connector and packing arrangement on one side of the center body in accordance with embodiments of the present invention.
Figure 24:
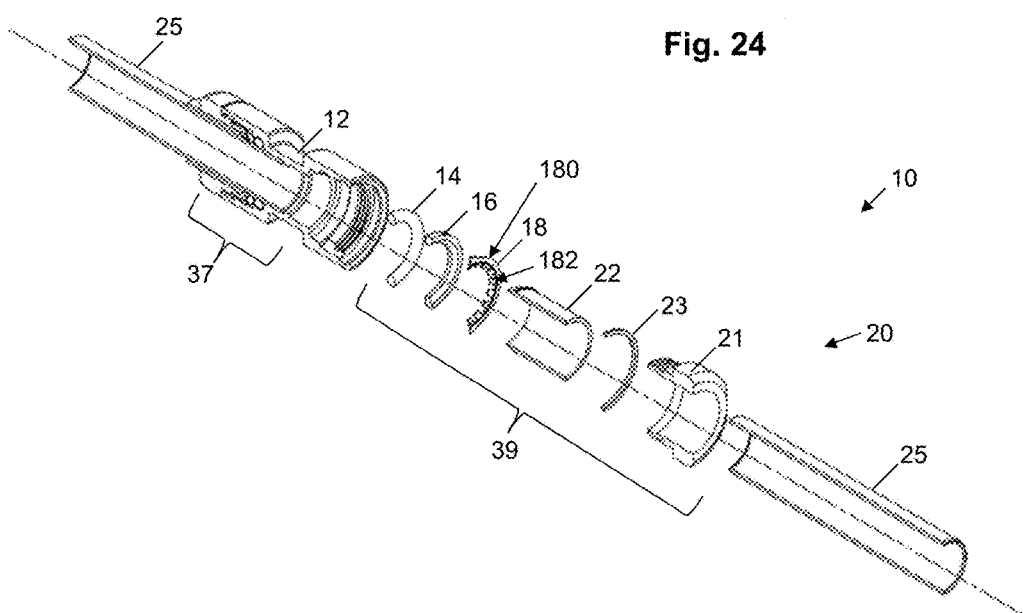
FIG. 24 is a perspective view showing the elements of the device of FIG. 23 in cross-section.

A similar installation of another tube 25 can take place at the other end of the fitting 12, as illustrated in FIGS. 23 and 24.

Among other things, the assembly of the embodiments of the present invention prevents rotation of the fitting about an inserted tube. It will further be appreciated that, in various embodiments of the present invention, the members of the push connect joint assembly are formed through hydroforming processes. It will be appreciated that any and all dimensions described herein are exemplary and provided as embodiments associated with proper working operation of the present invention.

The invention may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

The invention claimed is:

1. A hybrid push-to-connect fitting, comprising:
   a fitting body having an interior wall and an exterior wall, wherein the interior wall defines a cavity extending through the fitting along a fitting axis, a sealing ring compartment and a nut connector assembly compartment;
   at least one sealing ring positioned within the sealing ring compartment;
   a fastening ring having a base portion and teeth, wherein the base portion is positioned at least partially within the nut connector assembly compartment and has a radially outer edge in contact with the fitting interior wall; and
   a nut connector assembly positioned within the nut connector assembly compartment, the nut connector assembly comprising a nut connector threadedly secured to the interior wall of the fitting, wherein the nut connector has an outer surface having at least one groove formed therein, and a lock washer secured in the at least one groove.

2. The fitting of claim 1, wherein the nut connector includes a radially inner surface, and further including a release pusher member slidably maintained against the nut connector radially inner surface.

3. The fitting of claim 1, wherein the interior wall of the fitting at the nut connector assembly compartment is formed with at least one thread at a first radial distance from the fitting axis, an axial outer wall portion at a second radial distance from the fitting axis and a gap wall portion at a third radial distance from the fitting axis.

4. The fitting of claim 3, wherein the at least one thread is formed axially inwardly of the axial outer wall portion and the gap wall portion, and the gap wall portion is formed axially inwardly of the axial outer wall portion.

5. The fitting of claim 3, wherein the third radial distance is greater than the first and second radial distances.

6. The fitting of claim 5, wherein the second radial distance is greater than the first radial distance.

7. The fitting of claim 1, wherein the radially outer edge of the fastening ring includes a common outer edge portion having a first radius, and at least one prolated ear member having a second radius that is larger than the first radius.

8. The fitting of claim 7 wherein the prolated ear member is substantially arc-shaped.

9. A method for producing a hybrid push-to-connect joint assembly, comprising:
   providing a fitting having an interior wall and an exterior wall, wherein the interior wall defines a cavity extending through the fitting along a fitting axis, a sealing ring compartment and a nut connector assembly compartment;
   positioning at least one sealing ring within the sealing ring compartment;
   providing a fastening ring having a base portion, teeth and a radially outer edge, and positioning the base portion at least partially within the nut connector assembly compartment such that the radially outer edge is in contact with the fitting interior wall; and
   securing a nut connector assembly within the nut connector assembly compartment, the nut connector assembly comprising a nut connector threadedly secured to the interior wall of the fitting, wherein the nut connector has an outer surface having at least one groove formed therein, and a lock washer secured in the at least one groove.

10. The method of claim 9, wherein the nut connector includes a radially inner surface, and further including the step of positioning a release pusher member so as to be slidably maintained against the nut connector radially inner surface.

11. The method of claim 9, wherein the interior wall of the fitting at the nut connector assembly compartment is formed with at least one thread at a first radial distance from the fitting axis, an axial outer wall portion at a second radial distance from the fitting axis and a gap wall portion at a third radial distance from the fitting axis.

12. The method of claim 11, wherein the at least one thread is formed axially inwardly of the axial outer wall portion and the gap wall portion, and the gap wall portion is formed axially inwardly of the axial outer wall portion.

13. The method of claim 11, wherein the third radial distance is greater than the first and second radial distances.

14. The method of claim 13, wherein the second radial distance is greater than the first radial distance.

15. The method of claim 9, wherein the radially outer edge of the fastening ring includes a common outer edge portion having a first radius, and at least one prolated ear member having a second radius that is larger than the first radius.

16. The method of claim 15 wherein the prolated ear member is substantially arc-shaped.

17. A hybrid push-to-connect fitting, comprising:
   a fitting having an interior wall and an exterior wall, wherein the interior wall defines a cavity extending through the fitting along an internal axis, and wherein the interior wall includes a sealing ring compartment and a nut connector assembly compartment, wherein the interior wall of the fitting at the nut connector assembly compartment is formed with at least one thread at a first radial distance from the fitting axis, an axial outer wall portion at a second radial distance from the fitting axis and a gap wall portion at a third radial distance from the fitting axis, wherein the second radial distance is greater than the first radial distance, and wherein the at least one thread is formed axially inwardly of the axial outer wall portion and the gap wall portion, and the gap wall portion is formed axially inwardly of the axial outer wall portion, and wherein the third radial distance is greater than the first and second radial distances.

18. A hybrid push-to-connect fitting, comprising:
a fitting having an interior wall and an exterior wall, wherein the interior wall defines a cavity extending through the fitting along an internal axis and includes first and second interior wall portions separated by a tube stop element extending radially into the cavity from the interior wall, wherein the first wall portion includes a first sealing ring compartment and a first nut connector assembly compartment, and wherein the second wall portion includes a second sealing ring compartment and a second nut connector assembly compartment;
a first packing arrangement inserted into the cavity so as to engage the first interior wall portion of the fitting;
a second packing arrangement inserted into the cavity so as to engage the second interior wall portion of the fitting; and
wherein the first and second packing arrangements each comprise at least one sealing ring, a fastening ring and a nut connector assembly having a nut connector and a lock washer, wherein the nut connector assembly of at least the first packing arrangement comprises a nut connector threadedly secured to the first interior wall portion of the fitting, wherein the nut connector has an outer surface having at least one groove formed therein, and a lock washer secured in the at least one groove.

19. The fitting of claim 18, wherein the first wall portion at the first nut connector assembly compartment is formed with at least one thread at a first radial distance from the fitting axis, an axial outer wall portion at a second radial distance from the fitting axis and a gap wall portion at a third radial distance from the fitting axis, wherein the at least one thread is formed axially inwardly of the axial outer wall portion and the gap wall portion, and the gap wall portion is formed axially inwardly of the axial outer wall portion, and wherein the third radial distance is greater than the first and second radial distances.

20. The fitting of claim 18 wherein the first and second packing arrangements further include a release pusher member.

* * * * *

UNITED STATES PATENT AND TRADEMARK OFFICE
CERTIFICATE OF CORRECTION

| | |
|---|---|
| PATENT NO. | : 9,574,691 B1 |
| APPLICATION NO. | : 15/146192 |
| DATED | : February 21, 2017 |
| INVENTOR(S) | : David B. Crompton, Libardo Ochoa Dias and Herbert J. Bouchard |

It is certified that error appears in the above-identified patent and that said Letters Patent is hereby corrected as shown below:

On the Title Page

Item [73], replace with the following:
Quick Fitting, Inc., Warwick, RI (US)

Signed and Sealed this
Twenty-ninth Day of May, 2018

Andrei Iancu
*Director of the United States Patent and Trademark Office*